(12) United States Patent
Jeong et al.

(10) Patent No.: US 11,043,691 B2
(45) Date of Patent: Jun. 22, 2021

(54) ELECTRODE ASSEMBLY AND METHOD FOR MANUFACTURING THE SAME

(71) Applicant: LG Chem, Ltd., Seoul (KR)

(72) Inventors: Yu Na Jeong, Daejeon (KR); Jae Han Jung, Daejeon (KR); Sung Pil Yoon, Daejeon (KR); Won Pyo Chae, Daejeon (KR); Da Woon Jeong, Daejeon (KR); Jeong Min Kim, Daejeon (KR); Young San Bae, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/340,779

(22) PCT Filed: May 23, 2018

(86) PCT No.: PCT/KR2018/005858
§ 371 (c)(1),
(2) Date: Apr. 10, 2019

(87) PCT Pub. No.: WO2018/217016
PCT Pub. Date: Nov. 29, 2018

(65) Prior Publication Data
US 2020/0091544 A1 Mar. 19, 2020

(30) Foreign Application Priority Data
May 25, 2017 (KR) .......................... 10-2017-0064898

(51) Int. Cl.
*H01M 10/0583* (2010.01)
*H01M 10/04* (2006.01)
(Continued)

(52) U.S. Cl.
CPC ..... *H01M 10/0459* (2013.01); *H01M 10/0583* (2013.01); *H01M 50/46* (2021.01); *H01M 50/531* (2021.01)

(58) Field of Classification Search
None
See application file for complete search history.

(56) References Cited

U.S. PATENT DOCUMENTS 6,045,943 A 4/2000 Nowaczyk
2002/0160258 A1 10/2002 Lee et al.
(Continued)

FOREIGN PATENT DOCUMENTS

JP H10-70052 A 3/1998
JP 2001-291647 A 10/2001
(Continued)

OTHER PUBLICATIONS

Machine Translation of JP2001-291647 (Year: 2001).*
Supplementary European Search Report corresponding to European Patent Application No. 18806148.5, dated Aug. 28, 2019, 8 pages.

*Primary Examiner* — Wyatt P McConnell
(74) *Attorney, Agent, or Firm* — Lerner, David, Littenberg, Krumholz & Mentlik, LLP

(57) ABSTRACT

The present invention relates to an electrode assembly in which a plurality of electrode units are stacked to improve product stability when manufactured and a method for manufacturing the same.

In addition, the present invention is provided to include a plurality of electrode units on which electrode tabs are formed and a full length-side separator member folded in a direction in which the electrode tabs are formed and a direction opposite to the direction in which the electrode tabs are formed while stacking the plurality of electrode units to be separated from each other.

10 Claims, 8 Drawing Sheets

(51) Int. Cl.
*H01M 50/46* (2021.01)
*H01M 50/531* (2021.01)

(56) References Cited

U.S. PATENT DOCUMENTS

2007/0105014 A1* 5/2007 Shin .................. H01M 2/266
                                                           429/152
2011/0052964 A1    3/2011  Kim et al.
2011/0104550 A1    5/2011  Ahn et al.
2011/0274960 A1   11/2011  Ahn
2013/0011715 A1    1/2013  Lee et al.

FOREIGN PATENT DOCUMENTS

| | | |
|---|---|---|
| JP | 5259453 B2 | 8/2013 |
| JP | 2014-035998 A | 2/2014 |
| KR | 10-2001-0082060 A | 8/2001 |
| KR | 10-2006-0122344 A | 11/2006 |
| KR | 10-2007-0049256 A | 5/2007 |
| KR | 10-0960619 B1 | 6/2010 |
| KR | 10-2011-0048132 A | 5/2011 |
| KR | 10-2011-0122378 A | 11/2011 |
| KR | 10-1152552 B1 | 6/2012 |
| KR | 10-2013-0006256 A | 1/2013 |
| KR | 10-2015-0056932 A | 5/2015 |
| KR | 10-1651712 B1 | 8/2016 |

* cited by examiner

ELECTRODE ASSEMBLY AND METHOD FOR MANUFACTURING THE SAME

CROSS-REFERENCES TO RELATED APPLICATIONS

This application is a U.S. national phase application, pursuant to 35 U.S.C. § 371, of PCT/KR2018/005858, filed May 23, 2018, designating the United States, which claims priority to Korean Application No. 10-2017-0064898, filed May 25, 2017. The entire contents of the aforementioned patent applications are incorporated herein by this reference.

TECHNICAL FIELD

The present invention relates to an electrode assembly and a method for manufacturing the same, and more particularly, to an electrode assembly in which a plurality of electrode units are stacked to improve product stability when manufactured and a method for manufacturing the same.

BACKGROUND ART

Due to the living environment surrounded by various electric and electronic devices, batteries (cells) that generate electric energy through physical or chemical reaction to supply the generated electric energy to the outside are used when AC power is not supplied to the building, or DC power is required.

Among such batteries, primary batteries and secondary batteries, which are chemical batteries using chemical reaction, are being generally used. The primary batteries are consumable batteries which are collectively referred to as dry batteries.

Secondary batteries are rechargeable batteries that are manufactured using a material in which a redox process between electric current and a substance is repeatable plural times. When the reduction reaction is performed on the material by the electric current, power is charged, and when the oxidation reaction is performed on the material, power is discharged. The charging-discharging is repeatedly performed to generate electricity.

A stacking-type lithium secondary battery including a different electrode active material layer is disclosed in Korean Patent Publication No. 10-2006-0122344.

In the lithium secondary battery according to the related art, a folding cell in which a plurality of electrode stacks are stacked is manufactured.

However, the pouch-type battery has a problem in that applied tension is lower in a full length direction (a direction in which an electrode tab is formed) than in a full width direction because the pouch-type battery takes a manner in which winding and folding are performed in the full width direction (a direction perpendicular to the electrode tab) of the electrode stack.

Further, there is a problem in which a bonding force between a separator and an electrode is low because an upper end of the electrode stack, on which positive/negative electrode tabs are disposed, is more loosely bonded to an electrode unit such as a bicell or the like.

The upper end of the electrode stack may increase in resistance due to the above problems to generate a lithium-plating. Since it is difficult to seal the upper end, there is a disadvantage in thermal stability evaluation criteria such as heating.

DISCLOSURE OF THE INVENTION

Technical Problem

The present invention has been made in order to solve the above problem, and thus an object of the present invention is to provide an electrode assembly to ensure security of the electrode assembly and a method for manufacturing the same.

Technical Solution

Therefore, the present invention has been made to solve the above-mentioned problem, and an object of the prevent invention is to provide an electrode assembly that is capable of securing safety of an electrode unit and a method for manufacturing the electrode assembly.

An electrode assembly according to an embodiment of the present invention includes a plurality of electrode units on which electrode tabs are formed and a full length-side separator member folded in a direction in which the electrode tabs are formed and a direction opposite to the direction in which the electrode tabs are formed while stacking the plurality of electrode units to be separated from each other.

The full length-side separator member may include a folding part that is folded at a portion corresponding to each of the electrode tabs.

The full length-side separator member may include a tab aperture that is perforated to allow the electrode tab to pass therethrough.

The electrode assembly may further include a full width-side separator member that extends from the full length-side separator member and formed in a direction perpendicular to the full length-side separator member.

The full width-side separator member may be folded in a direction perpendicular to the direction in which the electrode tab is formed to allow electrode units that are stacked subsequent to the plurality of electrode units to be stacked being separated from each other.

The full width-side separator member may be formed on at least one end of the full length-side separator member.

The full width-side separator member may be formed in a length of the full length-side separator member.

The entire electrode unit except the electrode tab may be covered by the full length-side separator member and the full width-side separator member.

The electrode unit may be a unit assembly having a configuration in which a separator is stacked between a positive electrode and a negative electrode.

A method for manufacturing an electrode assembly according to an embodiment of the present invention includes a preparation step of preparing a plurality of electrode units on which electrode tabs are formed and a full length-side stacking step of folding a full length-side separator member in a direction in which the electrode tab of each of the electrode units is formed and a direction opposite to the direction in which the electrode tab is formed to be stacked to allow the plurality of electrode units to be separated from each other.

The method may further include, after the full length-side stacking step, a full width-side stacking step of folding a full width-side separator member in a direction perpendicular to the direction in which the electrode tab is formed to be stacked to allow electrode units that are stacked subsequent to the plurality of electrode units to be separated from each other.

Advantageous Effects

According to the present invention, the safety of the upper end of the electrode unit may be secured.

According to the present invention, the safety of the lower end of the electrode unit may be secured.

According to the present invention, the safety during the drop test may be secured.

According to the present invention, the safety in the thermal safety evaluation criteria may be secured.

MODE FOR CARRYING OUT THE INVENTION

Figure 1:
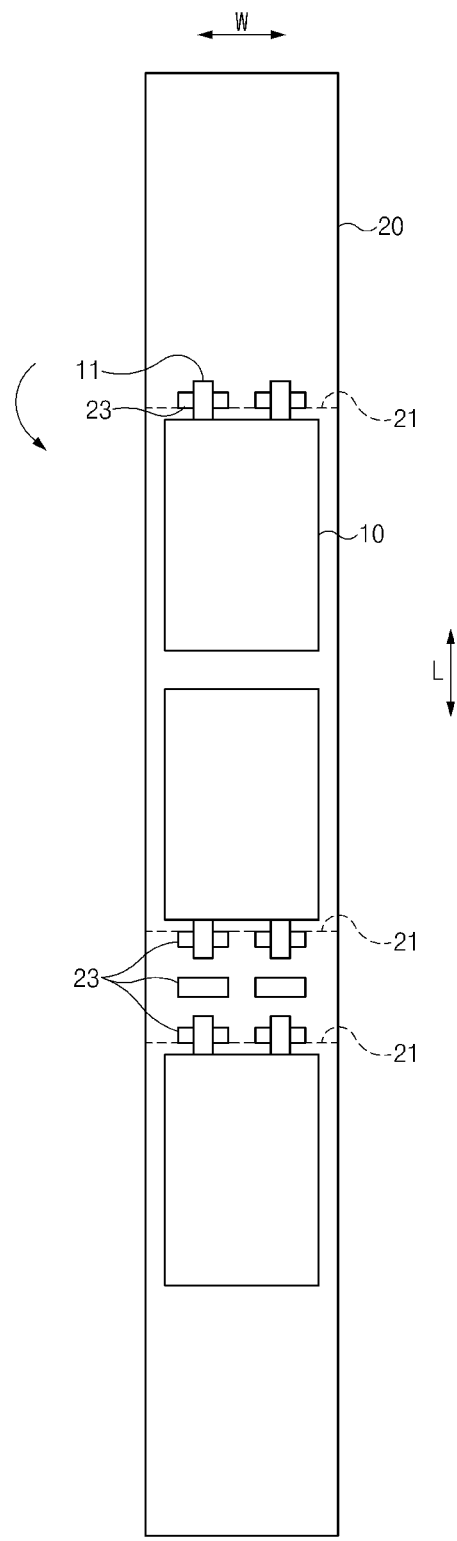
FIG. 1 is a development view of an electrode assembly according to an embodiment of the present invention.

Hereinafter, a secondary battery and a method for manufacturing the same according to preferred embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be omitted in order to prevent unnecessarily obscuring subject matters of the present invention.

Figure 2:
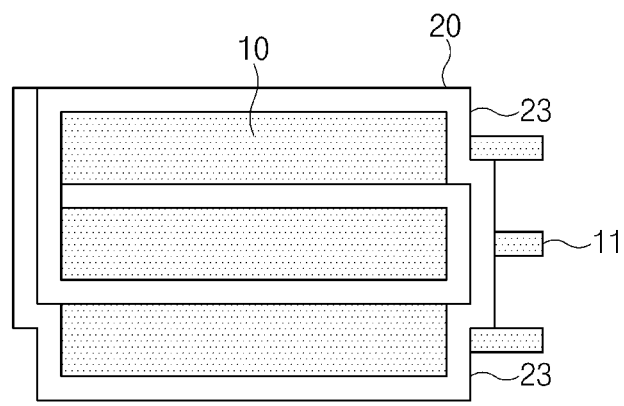
FIG. 2 is a side view illustrating a state in which the electrode assembly of FIG. 1 is folded to be stacked.

FIG. 1 is a development view of an electrode assembly according to an embodiment of the present invention, and FIG. 2 is a side view illustrating a state in which the electrode assembly of FIG. 1 is folded to be stacked.

As illustrated in FIGS. 1 and 2, an electrode assembly according to an embodiment of the present invention includes a plurality of electrode units 10 on which electrode tabs 11 are formed and a full length-side separator member 20 that is folded in a direction in which the electrode tab 11 is formed and a direction opposite to the direction in which the electrode tab 11 is formed while stacking the plurality of electrode units 10 to be separated from each other.

According to an embodiment, each of the electrode units 10 may be a unit assembly having the form of a bicell of positive electrode (negative electrode)/separator/negative electrode (positive electrode)/separator/positive electrode (negative electrode). According to another embodiment, the electrode unit 10 may have the form of a full cell of positive electrode/separator/negative electrode. According to still another embodiment, the electrode unit 10 may be a single electrode such as a negative electrode or a positive electrode.

The full length-side separator member 20 may include a folding part 21 that is folded at a portion that corresponds to the electrode tab 11 of the electrode unit 10.

The full length-side separator member 20 may include a tab aperture 23, which is perforated to allow the electrode tab 11 to pass therethrough, in the folding part 21.

Further, the tab aperture 23 may be formed by perforating a portion, at which the electrode tab 11 needs to be penetrated, in the full length-side separator member 20 in addition to the folding part 21.

When the folding part 21 of the full length-side separator member 20 is folded at the portion that corresponds to the electrode tab 11 of the electrode unit 10, the electrode tab 11 may pass through the tab aperture 23. Thus, the full length-side separator member 20 may cover the electrode unit 10 in a full length direction L. The full length-side separator member 20 may cover all portions except the electrode tab 11 in the full length direction L.

In addition, in the state in which the electrode assembly is installed in the secondary battery, when a gas is generated due to a reaction between the electrode and an electrolyte, the gas may be discharged through the tab aperture 23.

As described above, since the separator is folded in a direction along the full length side of the electrode unit 10, i.e., the side at which the electrode tab 11 is formed, to stack the electrode units 10, a bonding force between the electrode and the separator may increase at the portion where the electrode tab 11 is formed, which is difficult to seal.

Thus, the portion, at which the electrode tab 11 of the electrode unit 10 is formed, may be reduced in electrical resistance to prevent a lithium-plating from forming and to secure stability in thermal safety evaluation such as heating.

In other words, according to the related art, since the separator member is folded in only a full width direction W, the tension is low in the full length direction. Thus, the bonding force between the electrode and the separator are relatively low in the full length direction L. As a result, the electrical resistance is increased at the upper end along the full length direction L, and the lithium-plating may be formed to provide disadvantage in the thermal safety evaluation.

Moreover, the full length-side separator member 20 may be folded to an opposite side of the portion, at which the electrode tab 11 of the electrode unit 10 is formed, to secure the bonding force between the separator and the electrode unit 10, thereby securing the safety in the evaluation such as a drop test.

Furthermore, according to the related art, since the full length-side separator member 20 is folded in only the full width direction W, an end of the separator may be sealed to the electrode tab formation portion to prevent the separator from being separated from the formation portion of the electrode tab 11 in the full length direction. On the other hand, according to the present invention, since the end of the electrode is covered by the separator member in the full width direction W, the separation of the separator may be prevented without performing the sealing.

Figure 3:
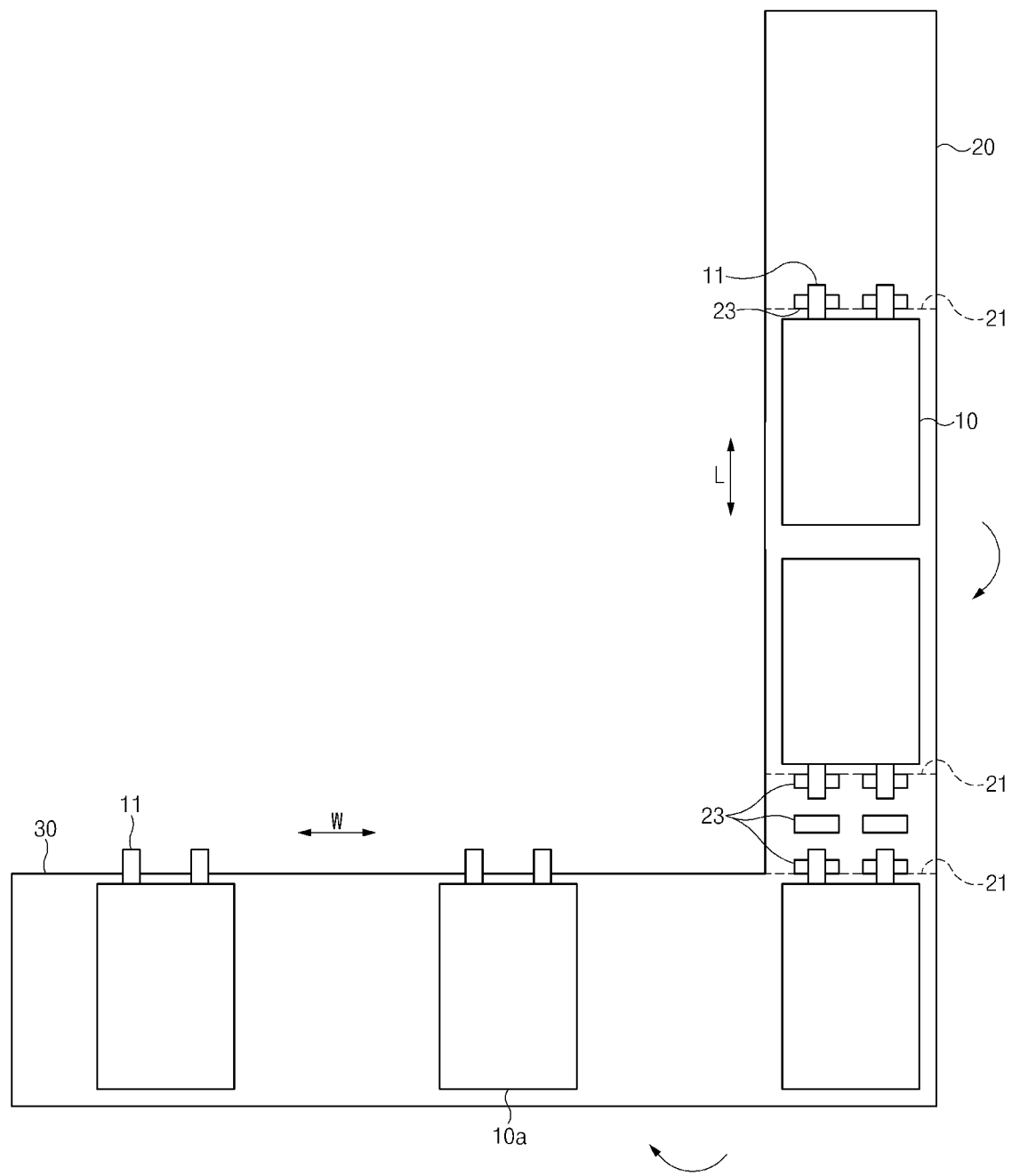
FIG. 3 is a development view of an electrode assembly according to another embodiment of the present invention.
Figure 4:
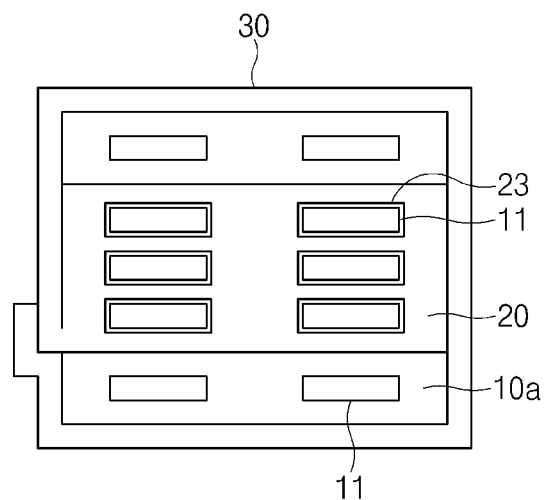
FIG. 4 is a front view illustrating a state in which the electrode assembly of FIG. 3 is folded to be stacked.
Figure 5:
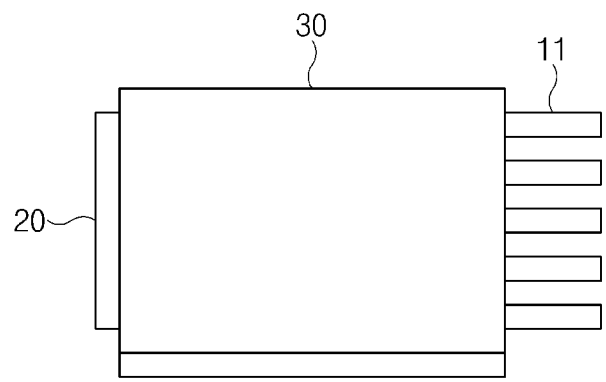
FIG. 5 is a side view of FIG. 4.

FIG. 3 is a development view of an electrode assembly according to another embodiment of the present invention, FIG. 4 is a front view illustrating a state in which the electrode assembly of FIG. 3 is folded to be stacked, and FIG. 5 is a side view of FIG. 4.

As illustrated in FIGS. 3 to 5, an electrode assembly according to another embodiment of the present invention may further include a full width-side separator member 30 that extends from a full length-side separator member 20 and formed in a direction perpendicular to the full length-side separator member 20.

The full width-side separator member 30 may extend perpendicular to at least one ends of the full length-side separator member 20.

Figure 6:
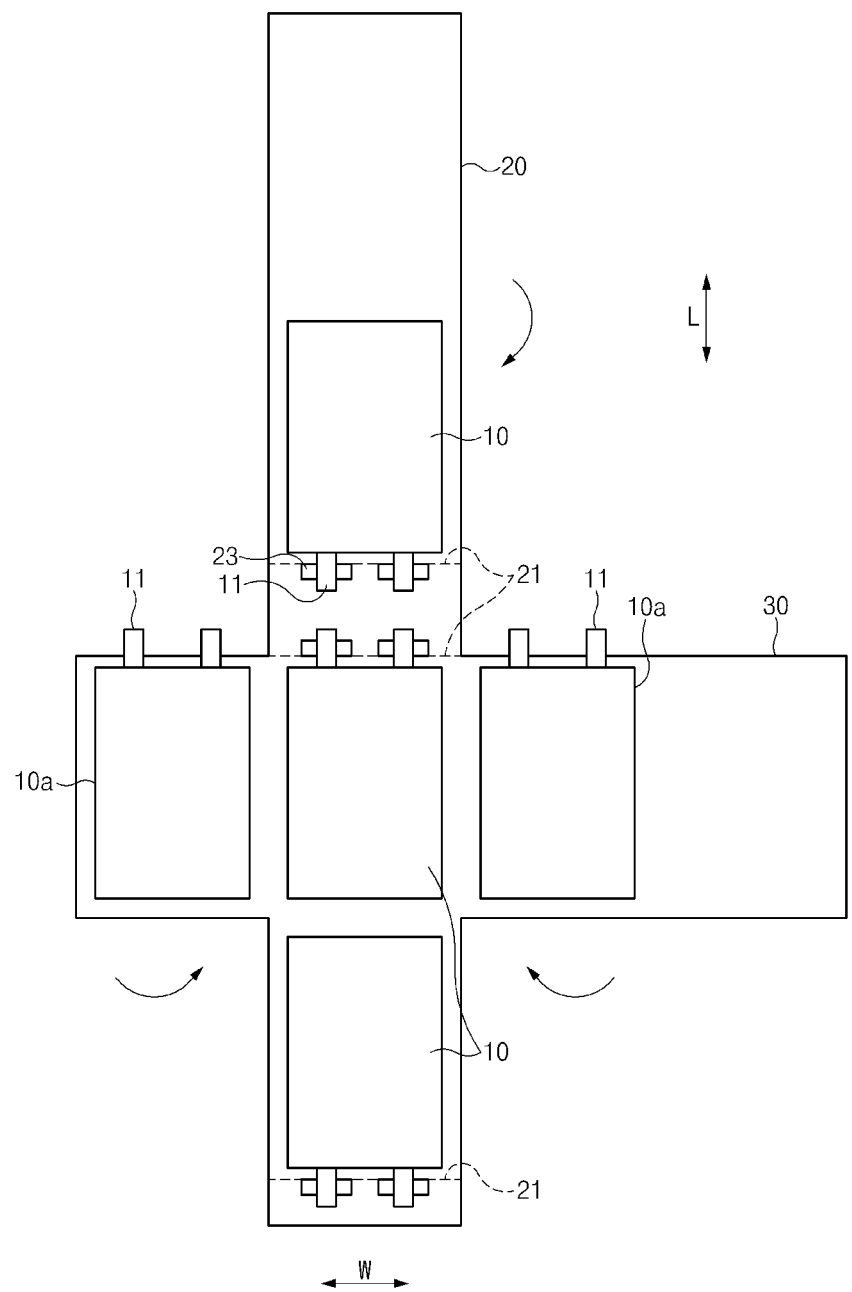
FIG. 6 is a development view illustrating an electrode assembly according to still another embodiment of the present invention.
Figure 7:
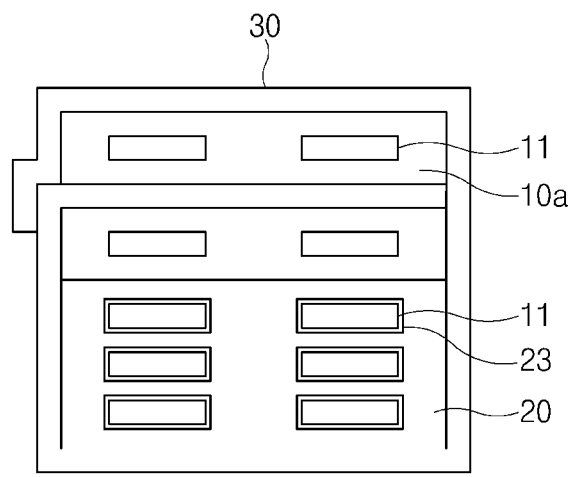
FIG. 7 is a side view illustrating a state in which the electrode assembly of FIG. 6 is folded to be stacked.

FIG. 6 is a development view illustrating an electrode assembly according to still another embodiment of the present invention, and FIG. 7 is a side view illustrating a state in which the electrode assembly of FIG. 6 is folded to be stacked.

As illustrated in FIGS. 6 and 7, in an electrode assembly according to the still another embodiment of the present invention, a full width-side separator member 30 may be formed in a length of a full length-side separator member 20.

As described above, in the electrode assemblies according to another embodiment and still another embodiment of the present invention, the full width-side separator member 30 may be folded toward the plurality of electrode units 10 stacked on the full length-side separator member 20 to stack electrode units 10a to be separated from each other, which are stacked subsequent to the plurality of electrode units 10.

Referring to FIG. 6, the separator member 20 is folded first, and subsequently, the separator member 30 is folded again in the full width direction W to stack the electrode units, thereby manufacturing the electrode assembly.

In this case, the electrode unit 10a may be folded in a direction perpendicular to a direction in which an electrode tab 11 is formed.

Thus, the electrode unit 10 is covered toward the full length side by the full length-side separator member 20 and covered toward the full width side by the full width-side separator member 30 to cover all four sides of the electrode unit 10 except the electrode tab 11.

In particular, since the entire electrode unit 10 except the electrode tab 11 is covered by the separator, bonding between the electrode unit 10 and the separator may be strongly maintained at even a portion, which is adjacent to the electrode tab 11 that is difficult to be sealed, in the electrode unit 10 to prevent a lithium-plating from occurring and may improve safety in the thermal safety evaluation such as heating.

In addition, the bonding between the electrode unit 10 and the separator may also be strongly maintained at a portion that is opposite to the formation portion of the electrode tab 11 in the electrode unit 10 to secure the safety in a drop test.

Furthermore, the electrode assembly according to the present invention may have an effect achieved when the four sides of the electrode unit are completely covered by the separator.

The four edge surfaces of the electrode unit may be closed not by thermal fusion or bonding processing but by the separator member. Thus, damage due to the thermal fusion processing or the bonding processing may be prevented.

The separators of the full length-side separator member 20 and the full width-side separator member 30 according to an embodiment of the present invention may be manufactured, for example, by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

Figure 8:
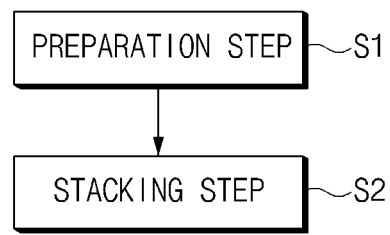
FIG. 8 is a flowchart sequentially illustrating a method for manufacturing an electrode assembly according to an embodiment of the present invention.

FIG. 8 is a flowchart sequentially illustrating a method for manufacturing an electrode assembly according to an embodiment of the present invention.

As illustrated in FIG. 8, a method for manufacturing an electrode assembly according to an embodiment of the present invention includes a preparation step (S1) and a stacking step (S2).

The preparation step (S1) is a step of preparing a plurality of electrode units 10 on which electrode tabs 11 are formed.

A full length-side stacking step (S2) may include a step of placing the plurality of electrode units 10 on a full length-side separator member 20.

In addition, the full length-side stacking step (S2) is a step of folding the full length-side separator member 20 in a direction in which the electrode tab 11 of the electrode unit 10 is formed and a direction opposite to the direction in which the electrode tab 11 is formed to stack the plurality of electrode units 10.

Further, when the full length-side separator member 20 is folded at the portion on which the electrode tab of the electrode unit 10 is formed, the electrode tab 11 may pass through a tab aperture 23 that is perforated in the full length-side separator member 20.

After the full length-side stacking step (S2), a full width-side stacking step in which electrode units 10a that are stacked subsequent to the plurality of electrode units 10 stacked on the full length-side separator member 20 are stacked to be separated from each other may be further performed in succession to the full length-side stacking step (S2).

In the full width-side stacking step, the electrode units 10a are placed on the full width-side separator member 30 and subsequently folded in a direction perpendicular to the direction in which the electrode tabs 11 of the electrode units 10a are formed to stack the electrode units 10a.

As described above, according to the present invention, the safety of the upper end of the electrode unit may be secured, and the safety of the lower end of the electrode unit may be secured. In addition, the safety may be secured during the drop test, and the safety in thermal safety evaluation criteria may be secured.

Although the electrode assembly and the method for manufacturing the same according to the present invention has been described above with reference to the exemplary drawings, various changes and modifications may be made thereto by one skilled in the art without departing from the scope and spirit of the invention as set forth in the appended claims.

The invention claimed is:
1. An electrode assembly, comprising:
a full length-side separator member extending in a length direction; and
a plurality of first electrode units having first electrode tabs, one of the first electrode units disposed on the full length-side separator member such that the first electrode tabs of the one of the first electrode units are oriented in a first direction in the length direction and another one of the first electrode units being disposed on the full length-side separator member adjacent to the one of the first electrode units such that the first electrode tabs of the another one of the first electrode units are oriented in a second direction opposite the first direction, wherein the full length-side separator member defines a first pair of tab apertures between the one of the first electrode units and the another one of the first electrode units to receive the first electrode tabs of the one of the first electrode units, and the full length-side separator member defines a second pair of tab apertures between the one of the first electrode units and the another one of the first electrode units to receive the first electrode tabs of the another one of the first electrode units, the first pair of tab apertures spaced a distance apart from the second pair of tab apertures, and wherein the full length-side separator member is folded in the length direction to stack the plurality of first electrode units and separate them from each other.

2. The electrode assembly of claim 1, wherein the full length-side separator member comprises a folding part that is folded at a portion that corresponds to each of the first electrode tabs.

3. The electrode assembly of claim 1, further comprising a full width-side separator member that extends from the full length-side separator member in a direction perpendicular to the full length-side separator member, the full width-side separator member carrying a plurality of second electrode units having second electrode tabs.

4. The electrode assembly of claim 3, wherein the full width-side separator member is folded in a direction perpendicular to the length direction to stack the second electrode units subsequent to the plurality of first electrode units and separate them from each other.

5. The electrode assembly of claim 3, wherein the full width-side separator member is formed on at least one end of the full length-side separator member.

6. The electrode assembly of claim 3, wherein a length of the full width-side separator member is equal to a length of the full length-side separator member.

7. The electrode assembly of claim 3, wherein each one of the plurality of first electrode units except for the first electrode tabs is entirely covered by the full length-side separator member (20) and each one of the plurality of second electrode units except for the second electrode tabs is entirely covered by the full width-side separator member.

8. The electrode assembly of claim 1, wherein the electrode unit is a unit assembly having a configuration in which a separator is stacked between a positive electrode and a negative electrode.

9. A method for manufacturing an electrode assembly, the method comprising:

a preparation step of preparing a plurality of first electrode units having first electrode tabs;

a first providing step of disposing one of the first electrode units on a full length-side separator member extending in a length direction such that the first electrode tabs of the one of the first electrode units are oriented in a first direction in the length direction;

a second providing step of disposing another one of the first electrode units on the full length-side separator member adjacent to the one of the first electrode units such that the first electrode tabs of the another one of the first electrode units are oriented in a second direction opposite the first direction; and a full length-side stacking step of folding the full length-side separator member in the length direction to stack the plurality of first electrode units and separate them from each other, wherein, during the full length-side stacking step, the first electrode tabs of the one of the first electrode units is passed through a first pair of tab apertures located between the one of the first electrode units and the another one of the first electrode units, and the first electrode tabs of the another one of the first electrode units is passed through a second pair of tab apertures located between the one of the first electrode units and the another one of the first electrode units, the first pair of tab apertures being spaced apart from the second pair of tab apertures.

10. The method of claim 9, further comprising, after the full length-side stacking step, a full width-side stacking step of folding a full width-side separator member in a direction perpendicular to the length direction to stack second electrode units subsequent to the plurality of first electrode units and to separate them from each other.

* * * * *